UNITED STATES PATENT OFFICE.

W. A. OTTO WUTH, OF PITTSBURG, PENNSYLVANIA.

PROCESS OF PRODUCING STEEL FROM WROUGHT-IRON WITH PLUMBAGO.

SPECIFICATION forming part of Letters Patent No. 300,826, dated June 24, 1884.

Application filed July 14, 1883. (No specimens.)

*To all whom it may concern:*

Be it known that I, WILLIAM AUGUSTUS OTTO WUTH, of Pittsburg, in the county of Allegheny and State of Pennsylvania, have invented a new and useful Improvement in Processes of Producing Steel from Wrought-Iron with Plumbago; and I do hereby declare the following to be a full, clear, and exact description thereof, sufficient to enable those skilled in the art to use my invention.

The object of my invention is the production of a high grade of steel, substantially free from sulphur and phosphorus, and having a definite percentage of carbon. The process which I use is that known as the "Siemens-Martin" or "open-hearth" process, with certain modifications, which form the subject-matter of my invention, whereby the cost of production is reduced, and a higher quality of steel is obtained.

A great desideratum in the manufacture of steel of the higher grades—such as are used for tools, fire-boxes, boiler-plate, and nail-rods—is to come as near as possible to the ideal steel—*i. e.*, iron and carbon as free as possible from other elements, such as sulphur, copper, silicon, and phosphorus.

In the ordinary method of making steel by the open-hearth process a charge of blast-furnace metal or pig-iron is melted on the hearth of a Siemens furnace, and then decarburizing and desiliconizing the iron by gradually adding to the bath of molten metal a sufficient quantity of wrought-iron, or iron and ore, or by charging the furnace with pig metal and wrought-iron, and then smelting them together, regulating the amount of carbon in the resulting steel by adding to the charge a proper quantity of spiegeleisen or ferro-manganese. It has, however, been found impossible by that process to produce a steel sufficiently low in phosphorus, because of the amount of phosphorus present in pig metal made by the ordinary processes. It has been proposed to avoid this difficulty by making steel in the open hearth from wrought-iron instead of from pig-iron, and carburizing it to the required degree by melting the wrought-iron in presence of charges of carbon, in the shape of charcoal or lamp-black inclosed in boxes, and charged with the iron in the furnace. The objection to this process is that a large amount of carbon in excess of that which combines with the iron has to be used, because the charcoal or lamp-black readily oxidizes, so that only a portion of indefinite amount unites with the iron. It is therefore difficult by this process to determine with any sufficient degree of exactness the percentage of carbon in the resulting steel.

My improved process consists in making the steel from wrought-iron substantially free from sulphur, phosphorus, and carbon by melting it on an open hearth in contact with a form of carbon which will not oxidize at the heat necessary to smelt the iron, but which will unite with the iron at that heat. By this means I am able to produce a grade of steel which is not only substantially free from sulphur and phosphorus, but has also a definite amount of carbon, because of the fact that I start the operation with an iron which is free from carbon, and all the carbon charged therewith into the furnace unites with the iron, there being practically no appreciable loss of carbon by oxidation.

Any wrought-iron which is sufficiently low in phosphorus may be used as the basis of my process; but as the nearest possible approach to the absence of phosphorus is desirable, I prefer to use muck-bar produced by the process for which Letters Patent of the United States, No. 226,143, were granted to me on March 30, 1880, by tapping off the cinder which contains the oxidized phosphorus from the hearth of the puddling-furnace, and supplying its place by a fresh charge of artificial cinder free from phosphorus, whereby any of the original cinder containing phosphorus which remains in the furnace is so diluted as to reduce the percentage of phosphorus in the puddled iron to a minimum. Puddled iron can be readily produced by my patented process just referred to which does not contain more than .008 per cent. of phosphorus. This puddled iron or other decarburized iron having a very low percentage of phosphorus is cut into pieces of convenient length, and placed in the hearth of the furnace in layers piled one above the other. Between each layer of iron I place a thin stratum of plumbago, preferably in a pulverized condition, although it may be used in lumps. For this purpose I employ the plumbago of commerce, but of good quality, containing about ninetyeight per cent. of carbon and two per cent. of silica, with a trace of iron. I charge the hearth of the furnace with alternate layers of wrought-iron and plumbago until it is sufficiently full. The relative thickness of the strata of iron and plumbago will of course depend upon the amount of carbon which it is desired that the resulting steel should contain, and is a matter of easy determination. If the iron were absolutely free from slag, and the plumbago were also absolutely pure carbon, then the proportions of the charge would be the same as the proportion of iron and carbon in the desired steel product; but as there is always more slag in muck-bar, (not, however, exceeding one per cent.,) and some silica in the plumbago, the proportions of which can be ascertained before the furnace is charged, the necessary allowance for these elements will have to be made, and the percentage of carbon can be regulated with great exactness, so as to produce steel very nearly approaching to an ideal steel. The furnace being thus charged with muck-bar and plumbago, as described, the charge is melted in the usual way, and the operation further carried on in the well-known method of practicing the open-hearth process. Before the melted metal is withdrawn from the furnace a small and definite amount of spiegeleisen or ferro-manganese is added.

By the process described I have made several charges of steel of twelve tons each, containing as low as one hundredth of one per cent. of phosphorus, and I am able to produce any kind of fine steel that may be desired.

I am aware that plumbago has heretofore been employed as a carburizing agent in the crucible process, in the converter process after dephosphorization, and also as a carburizer has been injected into baths of molten cast-iron during the puddling process, and do not herein claim the same; but,

Having thus described my improvement, what I claim as my invention, and desire to secure by Letters Patent, is—

1. In making steel by the open-hearth process, charging the furnace with pieces of wrought-iron having a low percentage of phosphorus in layers, with a thin stratum of plumbago, preferably pulverized, interposed between the layers of iron, melting the charge of iron and plumbago in the open hearth, and finally adding to the melted metal spiegeleisen or ferro-manganese, substantially as described.

2. The production of steel by melting together in an open-hearth furnace pieces of substantially decarburized, desiliconized, and dephosphorized iron with plumbago in such proportions as to furnish the desired percentage of carbon to the resulting metal, substantially as described.

In testimony whereof I have hereunto set my hand this 10th day of July, A. D. 1883.

W. A. OTTO WUTH.

Witnesses:
W. B. CORWIN,
W. BAKEWELL.